(12) United States Patent
Manfredi et al.

(10) Patent No.: US 8,614,834 B2
(45) Date of Patent: Dec. 24, 2013

(54) METHOD OF GENERATING PATTERNS REPRESENTING A HALFTONE IMAGE

(75) Inventors: Renato Manfredi, Chamby (CH); Jean-François Foresti, Ecublens (CH)

(73) Assignee: KBA-Notasys SA, Lausanne (CH)

( * ) Notice: Subject to any disclaimer, the term of this patent is extended or adjusted under 35 U.S.C. 154(b) by 553 days.

(21) Appl. No.: 12/282,216

(22) PCT Filed: Apr. 10, 2007

(86) PCT No.: PCT/IB2007/051275
§ 371 (c)(1),
(2), (4) Date: Oct. 9, 2008

(87) PCT Pub. No.: WO2007/119203
PCT Pub. Date: Oct. 25, 2007

(65) Prior Publication Data
US 2009/0059304 A1   Mar. 5, 2009

(30) Foreign Application Priority Data
Apr. 13, 2006   (EP) .................................... 06112663

(51) Int. Cl.
*H04N 1/405* (2006.01)
(52) U.S. Cl.
USPC .......................... 358/3.28; 358/1.18; 358/468
(58) Field of Classification Search
USPC ......... 358/3.28, 1.9, 2.1, 1.18, 400, 500, 468; 101/150, 401, 401.1
See application file for complete search history.

(56) References Cited

U.S. PATENT DOCUMENTS

| | | |
|---|---|---|
| 4,033,059 A | 7/1977 | Hutton et al. |
| 4,588,212 A | 5/1986 | Castagnoli |
| 5,018,767 A | 5/1991 | Wicker |
| 5,062,359 A | 11/1991 | Giori et al. |

(Continued)

FOREIGN PATENT DOCUMENTS

| | | |
|---|---|---|
| WO | WO 83/00570 | 2/1983 |
| WO | WO 97/48555 | 12/1997 |

(Continued)

OTHER PUBLICATIONS

International Search Report for PCT/IB2007/051275 mailed Jul. 31, 2007.

*Primary Examiner* — Thomas D Lee
*Assistant Examiner* — Stephen M Brinich
(74) *Attorney, Agent, or Firm* — Nixon & Vanderhye P.C.

(57) ABSTRACT

A method is described for generating patterns representing a halftone image, said method comprising the generation of a first set of patterns consisting of lines and curves dimensionally modulated so as to produce variations in tones reproducing the halftones of the image using an intaglio rendering technique. The method comprises the generation of a second set of patterns consisting of microstructures separate from the lines and curves of the first set of patterns, said microstructures being dimensionally modulated so as to produce variations in tones reproducing the halftones of the image. According to a first aspect of the invention, the microstructures consist of stochastic microstructures that can be likened to a grain. According to a second aspect of the invention, the microstructures consist of repetitive microstructures reproducing information that can be recognized by an observer, which repetitive microstructures comprise microletters and/or microsymbols. The second set of patterns is interlaced with the first set of patterns in such a way that the microstructures of the second set of patterns occupy the spaces between the lines and curves of the first set of patterns and so that the halftones reproduced by the second set of patterns supplement the halftones reproduced by the first set of patterns.

37 Claims, 9 Drawing Sheets

(56) References Cited

U.S. PATENT DOCUMENTS

| | | |
|---|---|---|
| 5,675,420 A | 10/1997 | Beckett et al. |
| 6,964,227 B2 | 11/2005 | Franz |
| 7,275,484 B2 | 10/2007 | Franz |
| 2004/0007145 A1 | 1/2004 | Franz et al. |
| 2005/0115425 A1 | 6/2005 | Plaschka |
| 2005/0139100 A1 | 6/2005 | Franz et al. |

FOREIGN PATENT DOCUMENTS

| | | |
|---|---|---|
| WO | 02/20268 | 3/2002 |
| WO | 03/052702 | 6/2003 |
| WO | WO 03/103962 | 12/2003 |

METHOD OF GENERATING PATTERNS REPRESENTING A HALFTONE IMAGE

This application is the U.S. national phase of International Application No. PCT/IB2007/051275 filed 10 Apr. 2007 which designated the U.S. and claims priority to European Patent Application No. 06112663.7 filed 13 Apr. 2006, the entire contents of each of which are hereby incorporated by reference.

TECHNICAL FIELD

The present invention relates to a method of generating patterns representing a halftone image, this method comprising the generation of a first set of patterns consisting of lines and curves dimensionally modulated to produce variations in tones reproducing the halftones of the image according to an intaglio rendering technique. The present invention also relates to a method of producing an intaglio printing plate comprising the transposition by engraving of the duly generated patterns, and an engraved plate for producing intaglio printing plates.

TECHNOLOGICAL BACKGROUND

Intaglio is a secular printing technique that goes back to the 15th Century which consists in printing patterns by means of an engraved printing plate (or intaglio printing plate) which is inked on its surface, then wiped before printing in order to contain the applied ink or inks within the engravings of the plate. The duly inked printing plate is applied against the paper to be printed in a press exerting sufficient pressure on the paper against the printing plate for the ink of the engravings to be transferred to the paper. The result is a document comprising a printed pattern reflecting the engraved patterns with an additional relief or embossing, matching the printed pattern, which reflects the depth of the engravings and which can be recognized by touch.

For a long time, the intaglio printing plates were commonly engraved by hand in a plate made of soft metal, for example copper, brass or any other metal or appropriate metal alloy. The tools used by the engraver typically comprise burins or punches, the ends of which are sharpened and adapted to the desired dimensions of the patterns to be engraved, said patterns mainly consisting of lines and curves dimensionally modulated according to the action applied by the engraver to produce variations in tones reproducing the halftones of the image to be engraved (for example a portrait).

More recently, photolithographic techniques have been proposed to facilitate the transfer of images to the printing plates, as well as computer-assisted engraving methods.

The intaglio printing technique is notably used in the field of security printing, in particular for the printing of banknotes, intaglio printing remaining one of the techniques that is most difficult to counterfeit without appropriate equipment.

In the context of security printing, in particular the printing of banknotes, techniques have been developed to assist the engraver in his work, notably to reduce the engraving time required and the time to produce printing plates. The approach adopted until very recently involved producing a single engraved original (engraved by hand or assisted by technical engraving means) representing a single document to be printed, and in replicating this original as many times as necessary to produce a printing plate comprising several identical replicas of said original. According to this approach, the engraving technique employed follows that of an engraver, that is, each pattern is engraved according to the plot of the line or curve to be made, that is vectorially (see, for example, International application WO 97/48555).

The present applicant has proposed a new approach for the production of intaglio printing plates, an approach that is described in International application WO 03/103962 (incorporated herein by reference in its entirety). This method consists in generating a set of three-dimensional digital data consisting of pixels each representative of an individual point to be engraved in the surface of the plate to be engraved, the engraving being done pixel by pixel on the basis of said three-dimensional digital data. According to this technique, a printing plate can be directly engraved. Alternatively, a printing plate precursor (advantageously a metal plate supporting a layer of polymer) can be engraved. In the latter case, it is the polymer layer that is engraved and the duly formed precursor is then used to make printing plates by electroplating. The engraving is, moreover, advantageously done by laser.

Unlike the preceding approach, a whole plate can be engraved in a single phase, without the tedious process of replicating an original. According to the technique described in the International patent application WO 03/103962, the replication of the original on the plate is done digitally, this making it possible in particular to compensate the distortions of the paper during the intaglio printing process, a compensation that was quite simply impossible by using the techniques employed previously.

A considerable advantage of the abovementioned technique lies in the fact that it is essentially independent of the complexity of the patterns to be engraved, whereas the prior techniques are dependent on the level of complexity of the patterns to be engraved.

FIG. 1 shows a halftone image representative of the state of the art which illustrates a portrait of Jules Verne and which is formed by a set of patterns consisting of lines and curves dimensionally modulated to produce the variations in tones reproducing the halftones of the image. The illustrated patterns are produced according to a conventional intaglio rendering technique. As can be see in FIG. 1, different parts of the portrait are reproduced by means of various combinations of lines and curves. Thus, the parts A of the portrait representing the skin on the forehead, the cheeks, the nose, are typically represented by means of a set of crossed lines and curves, with the possible addition of a dot or a line segment (commonly called "interlines" or "inner dots") inside the lozenge-shaped spaces left between the crossed lines and curves. However, the hair and beard B are represented by a set of essentially parallel lines and curves. Finally, the eyes C are represented by a set of segments of concentric circles. All these representations, and others, are thus combined to reproduce various characteristic parts of the halftone image to be represented.

With regard to the conventional intaglio rendering technique illustrated in FIG. 1, a distinction should be drawn between this rendering technique and the photogravure (or rotogravure) rendering techniques which use regular screens of which the dot is dimensionally modulated to reproduce the halftones of the image. Although these techniques make it possible to reproduce halftone images, they have the disadvantage of eliminating any expressive force in the way with which the image is reproduced, rendering the image synthetic and lifeless, and equally degrading the level of security of such representations that can relatively easily be reproduced. Furthermore, photogravure employs inks that are comparatively more fluid than the intaglio inks and the printing method itself generates no relief on the printed document. Pattern generation methods for photogravure are, for example, described in document WO 83/00570. A device for the transposition by mechanical engraving of such patterns is for example described in publication U.S. Pat. No. 5,675,420.

From the security point of view, intaglio printing already in itself presents a high resistance to counterfeiting because of its specific features (relief, tactility, thickness of printed ink, etc.) which are difficult to reproduce with conventional means.

One way of increasing the level of security of intaglio prints for example involves incorporating microstructures that cannot be recognized by the naked eye in the printing itself. One solution notably involves structuring one of the lines or curves in the image in the form of a positive or negative microtext. The incorporation of such a microtext in a portrait is for example used in the American 100-Dollar banknote where the neckline of the portrait of the president Benjamin Franklin is structured to transcribe the expression "UNITED STATES OF AMERICA". A proposition along these lines also features in International application WO 02/20268.

However, in this International application WO 02/20268, it is simply a question of superimposing, in positive or in negative, fine structures (for example microletters or geometrical symbols) on one or more lines or curves of a halftone image which is reproduced according to a conventional intaglio rendering technique. This results in positively or negatively structured lines, mirroring the practice applied to the above-mentioned American 100-Dollar bill. This solution does not globally modify the rendering of the halftone image, which rendering is provided solely by a set of patterns consisting of dimensionally modulated lines and curves, where appropriate structured as indicated hereinabove.

Other solutions for increasing the security of the intaglio prints have been proposed. U.S. Pat. No. 5,018,767 for example proposes superimposing on the image a grid made up of parallel lines, the spacing of which is chosen to interfere with the operation of scanners and photocopiers.

Other solutions involve incorporating latent images in the intaglio print, that is, images that are revealed only under certain viewing conditions. Such solutions are notably proposed in publications U.S. Pat. No. 4,033,059 and U.S. Pat. No. 4,588,212. These solutions are, however, difficult to incorporate as such in halftone images without affecting the visual appearance of the latter.

There is therefore still a need to increase the level of security of the intaglio prints that represent halftone images.

DISCLOSURE OF THE INVENTION

One aim of the present invention is to enhance the techniques of the prior art.

One general aim of the present invention is therefore to propose a method of generating patterns representing a halftone image for the production of intaglio printing plates which makes it possible to achieve an enhanced level of security, making it possible to fight counterfeiting more effectively.

Another aim of the present invention is to propose such a method that does not in itself affect the general visual aspect of the reproduced image and that, on the contrary, enhances the rendering of the image.

The present invention satisfies these aims by proposing a method whose characteristics are stated in independent claim 1. According to the invention, the method thus comprises the generation of two sets of distinct patterns each reproducing the halftones of the image and that are interlaced in each other. The first set of patterns consists of lines and curves dimensionally modulated to produce variations in tones reproducing the halftones of the image using a conventional intaglio rendering technique. The second set comprises microstructures that are distinct from the lines and curves that make up the first set of patterns, which microstructures are dimensionally modulated to produce variations in tones reproducing the halftones of the image. According to the invention, the microstructures consist of stochastic microstructures that can be likened to a grain and/or repetitive microstructures reproducing information that can be recognized by an observer, which repetitive microstructures comprise microletters and/or microsymbols. The two sets are interlaced in such a way that the microstructures that make up the second set of patterns occupy the spaces between the lines and curves that make up the first set of patterns and so that the halftones reproduced by the second set of patterns complement the halftones reproduced by the first set of patterns.

The stochastic microstructures can be likened to a grain, that is, microstructures randomly distributed in the image plane (for example, a grain made up of dots distributed randomly), which stochastic microstructures preferably have dimensions of less than 10 microns. In this context, it should be noted that these stochastic microstructures can be clearly differentiated from a conventional grain applied uniformly to the whole of the image.

The repetitive microstructures made up of microletters and/or microsymbols reproduce information that can be recognized by an observer (using appropriate magnifying means). In this context, it appears advantageous that the first and second repetitive microstructures (for example two letters), or several microstructures, are dimensionally modulated in a differentiated way. In the context of the invention, it appears preferable for the line width of said repetitive microstructures not to exceed a few tens of microns.

The result of the implementation of the abovementioned method is an image with enhanced rendering and plastic effect, making it possible to reveal tones and nuances that cannot be created by using the conventional intaglio rendering technique alone. This result is distinguishable notably from what is conventionally produced in the field.

For example, the result of implementation of the present invention is distinguishable notably from the solution described in the abovementioned International application WO 02/20268 in that the second set of patterns generated according to the invention (namely, the stochastic microstructures that can be likened to a grain or the repetitive microstructures consisting of microletters and/or microsymbols) is, on the one hand, dimensionally modulated to produce variations in tones reproducing the halftones of the image and is, on the other hand, interlaced with the first set of patterns (namely the conventional lines and curves of the intaglio rendering) in such a way that the microstructures of the second set of patterns occupy the spaces between the lines and curves of the first set of patterns and so that the halftones reproduced by the second set of patterns complement the halftones reproduced by the first set of patterns.

Furthermore, the level of security of the resultant intaglio print is enhanced in as much as the integration and the interlacing of the second set of patterns in the interline space between the lines and curves of the first set of patterns can be reproduced only with highly accurate tools that are not directly available to counterfeiters. Furthermore, a replication by means of an engraving made by hand or by a semi-automated vectorial engraving method is too tedious to be able to be envisaged, bearing in mind that the second set of patterns comprises a myriad of microstructures whose dimensions are, moreover, modulated according to the halftones of the image. It is in particular not enough to add a conventional grain to the whole of the engraving to obtain a replica that is similar or corresponds to the original plate or to superimpose positive or negative fine structures as suggested in the International application WO 02/20268.

According to a variant of the invention, the microstructures of the second set are chosen and dimensionally modulated in such a way that the tone reproduced by these microstructures, for a determined area of the image, is more clear than the tone reproduced by the lines and curves that make up the first set of patterns. In this way, the expressivity that is specific to portraits (or other images) produced according to the conventional intaglio rendering techniques is maintained, while enhancing the dynamics and the tones of the image through the modulated microstructures of the second set.

According to yet another variant of the invention, the patterns generated are three-dimensional patterns which are dimensionally modulated in width (in the plane of the image) and/or in depth (perpendicularly to the plane of the image). In particular, provision is advantageously made to dimensionally modulate the lines and curves that make up the first set and the microstructures that make up the second set in different ways. Such an approach makes it possible to differentiate the patterns not only by their form, but also by the way in which they are modulated. For example, the lines and curves of the first set can be width and depth modulated whereas the microstructures of the second set can be modulated only in width or in depth. This differentiation will be advantageous in fighting even more effectively against counterfeiting.

For the same purpose, a determined engraving profile can be assigned to each set of patterns so as to offer an additional possibility for differentiating between the two sets of patterns.

The present invention is particularly advantageously applicable in the context of the production of portraits, labels or other pictorial patterns.

Other aspects of the invention are the subject of the dependent claims, in particular a method of producing an intaglio printing plate with the above-mentioned patterns, an engraved plate, notably for the production of intaglio printing plates, and a value document, notably a banknote.

BRIEF DESCRIPTION OF THE DRAWINGS

The characteristics and advantages of the present invention will become more clearly apparent from reading the detailed description that follows of embodiments of the invention, given purely as nonlimiting examples and illustrated by the appended drawings in which.

EMBODIMENTS OF THE INVENTION

Figure 1:
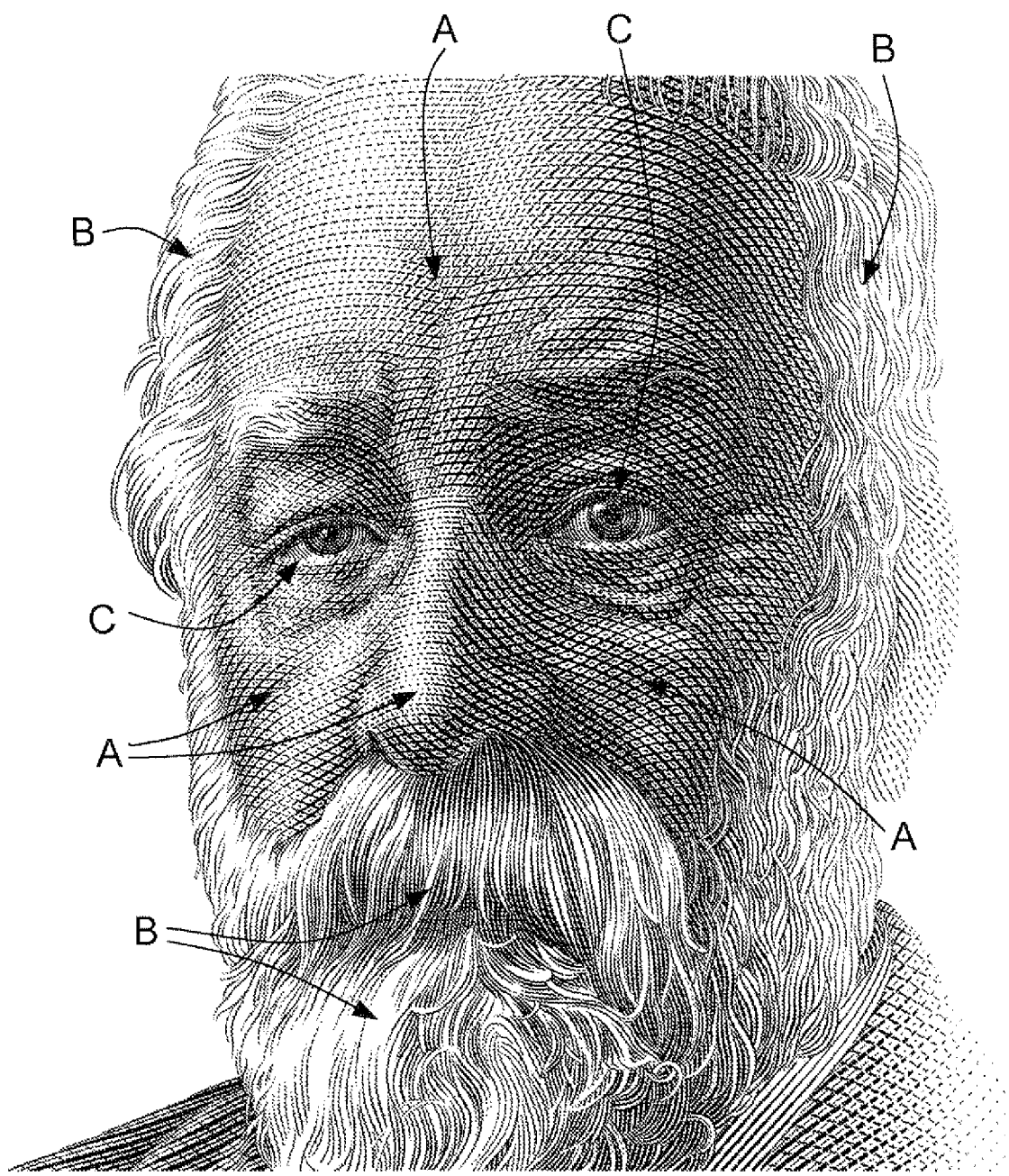
FIG. 1 shows a halftone image representative of the state of the art illustrating a portrait of Jules Verne according to a conventional intaglio rendering technique.
Figure 2:
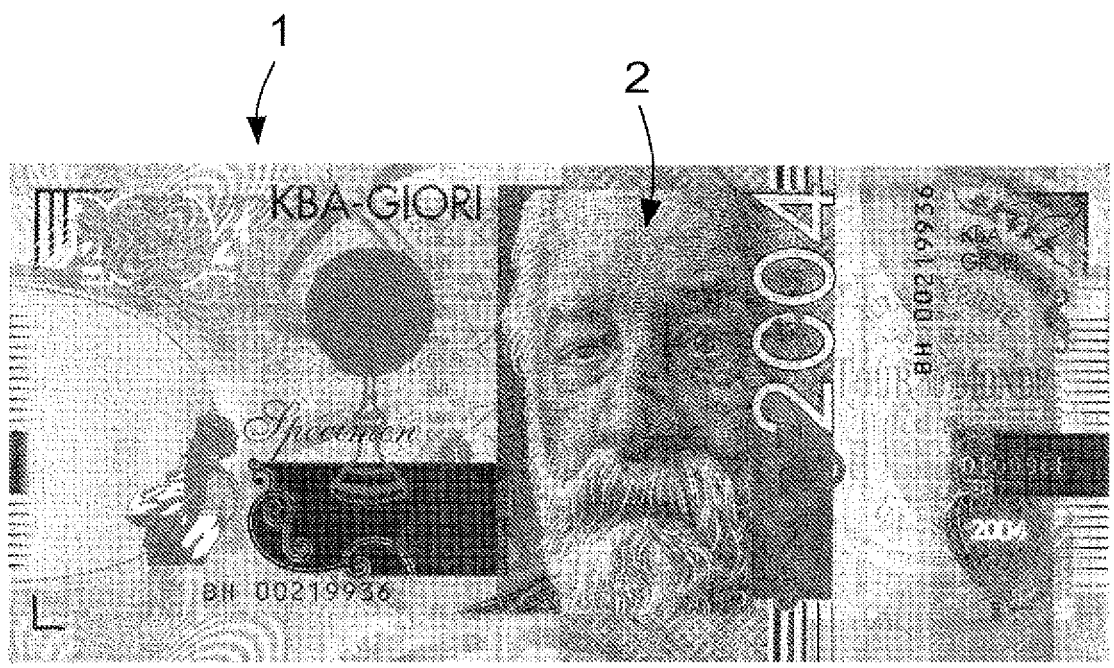
FIG. 2 shows a specimen banknote incorporating the portrait of FIG. 1 in the form of an intaglio print.

Hereinafter in the present description, reference will be made to FIGS. 1 and 3 to 9 which show portraits of Jules Verne according to various rendering techniques, and enlarged details of these portraits. For the purposes of the explanation, the portraits illustrated in these figures have been enlarged, including the illustrations of FIGS. 1, 3 and 6. It is important, however, to understand and realize that the illustrated portraits exhibit in reality a size of the order of less than ten or so centimeters high in order to be able to incorporate it in the drawing of a banknote. On this point, FIG. 2 shows a general view of a specimen of such a banknote 1 incorporating the portrait of FIG. 1 in the form of an intaglio print 2. Other patterns are intaglio printed on the specimen, for example the indication of the year "2004" and the geometrical patterns to the right of the portrait and the indications "KBA-GIORI" and "specimen" to the left of the portrait. In the embodiment illustrated in FIG. 2, the portrait 2 thus has a size of the order of 6 cm in height.

It is understood that the printed pattern 2 of FIG. 2 can advantageously be produced according to the invention that will now be described.

Figure 3:
FIG. 3 shows a halftone image illustrating the portrait of Jules Verne generated according to a first embodiment of the invention.

FIG. 3 shows a halftone image illustrating the portrait of Jules Verne generated according to a first embodiment of the invention. The original image on the basis of which the portrait is generated is identical to that used to generate the conventional portrait of FIG. 1. The plastic effect and the rendering of the image are, however, different. In particular, a careful examination of FIG. 3 reveals a greater fineness of detail, in particular in the areas with strong tone variation, notably in the region of the eyes. Such a fineness of rendering is not present in the portrait of FIG. 1 which is made up only of a set of patterns consisting of lines and curves dimensionally modulated according to the conventional intaglio rendering technique. In the portrait of FIG. 1, it is possible in particular to discern the lines and curves that make up the portrait, whereas in FIG. 3, the same lines and curves, presented in the same way, appear better integrated. In a general way, it can be said that the "plastic" effect of the image is enhanced, rendering, in the individual case, the portrait more expressive with a more faithful halftone effect.

This enhanced fineness in the embodiment of FIG. 3 is the result of the interlacing of a second set of patterns consisting of microstructures that are distinct from the lines and curves that make up the first set of patterns, said microstructures being dimensionally modulated to produce variations in tones reproducing the halftones of the image. More specifically, the interlacing of the two sets of patterns is done, according to the invention, in such a way that the microstructures that make up the second set of patterns occupy the spaces between the lines and curves that make up the first set of patterns and so that the halftones reproduced by the second set of patterns complement the halftones reproduced by the first set of patterns. In other words, the halftones of the portrait of FIG. 3 are reproduced by two separate and complementary sets of patterns.

More specifically, according to the first embodiment illustrated in FIG. 3, the microstructures are made up of stochastic microstructures, that is, microstructures that are essentially distributed randomly so as to form a background. These stochastic microstructures can be dots or more complex drawings. These stochastic microstructures can be likened to a grain. These stochastic microstructures should, however, be differentiated from a substantially uniform grain superimposed on the lines and curves forming the main drawing. In practice, according to the invention, the stochastic microstructures are dimensionally modulated to form a grain reproducing the halftones of the image. Such a modulation is not present in the grains that may be added to the conventional engravings.

Figure 4:
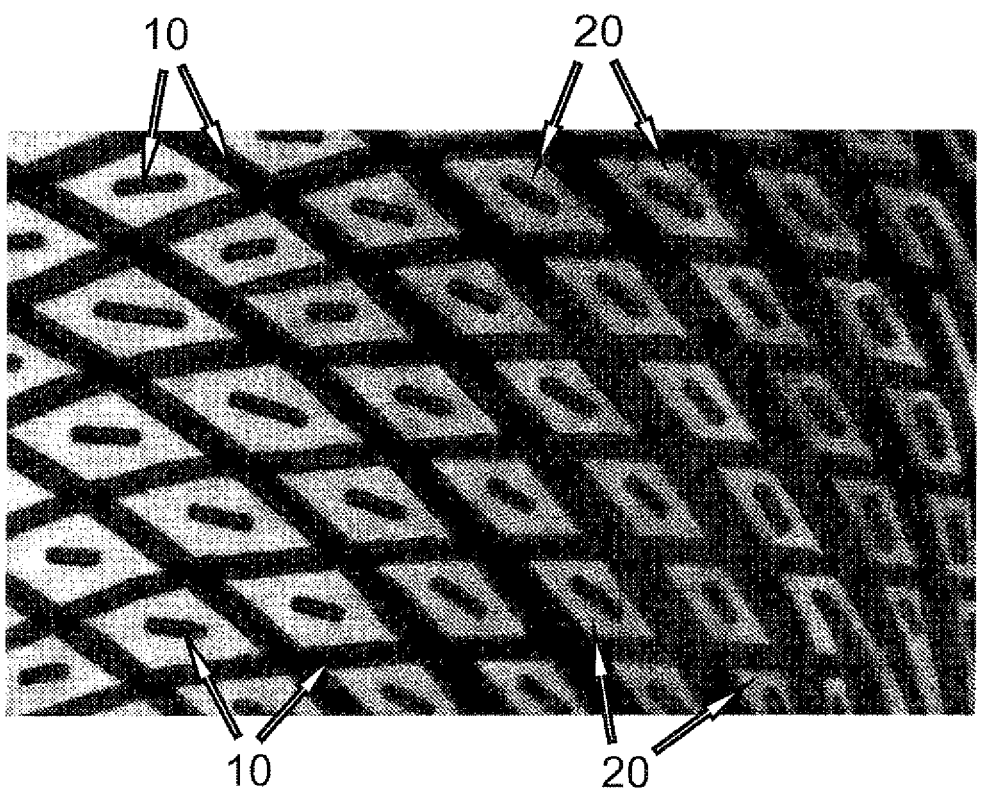
FIG. 4 shows an enlarged view of a detail of the portrait of FIG. 3, namely an area of the right part of the cheek.
Figure 5:
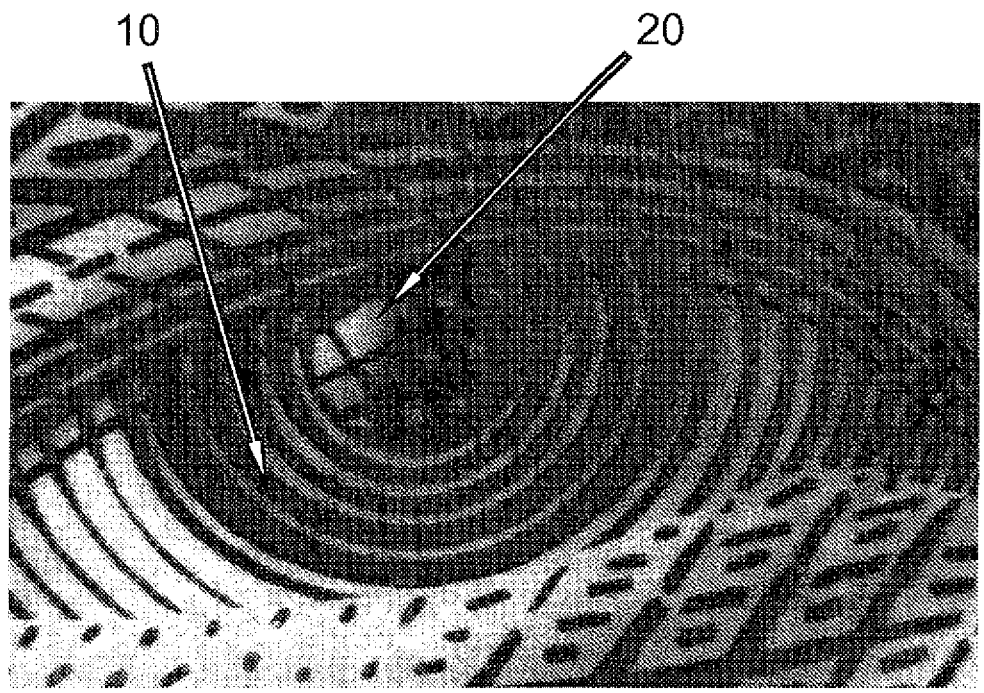
FIG. 5 shows an enlarged view of another detail of the portrait of FIG. 3, namely the area of the eye on the left part of the portrait.

FIGS. 4 and 5 show enlarged details of the portrait of FIG. 3, namely, respectively, an area of the right cheek of the portrait, below the right eye, and the area of the eye on the left part. As can better be seen in these figures, the lines and curves 10 that make up the first set of patterns (the "conventional" patterns of an intaglio representation) form spaces in which the stochastic microstructures 20 are positioned. The dimensional modulation of said stochastic microstructures 20 is particularly apparent in FIG. 5 which shows the detail of the left eye in which the variations in tones are particularly pronounced.

The stochastic microstructures 20 preferably have dimensions less than 10 microns rendering their detection and their resolution very difficult, or even impossible, by conventional photographic capture means, such as photocopiers or scanners.

Figure 6:
FIG. 6 shows a halftone image illustrating the portrait of Jules Verne generated according to a second embodiment of the invention.

Preferably, as illustrated in FIGS. 3 to 5, for a given area of the image, the tone reproduced by the lines and curves 10 is darker than the tone reproduced by the microstructures 20. This provides a way of ensuring a predominance of the lines and curves 10 in reproducing the tones and the contrast of the image and of better "casting" the microstructures 20 in the whole of the image. Furthermore, the effect of this differentiation is to "mask" the interlaced microstructures when the image is copied by conventional photographic capture means, such as photocopiers or scanners. In practice, in such a copy, the comparatively higher intensity of the lines and curves 10 will cause the capture means to be saturated in the direct vicinity of said lines and curves 10, making the microstructures 20 very difficult to detect. FIG. 6 shows a halftone image illustrating the portrait of Jules Verne generated according to a second embodiment of the invention. The original image on the basis of which the portrait is generated is once again identical to that used for the generation of the conventional portrait of FIG. 1 and of the portrait according to the first embodiment of FIG. 3. The plastic effect and the rendering of the image are similar to those of the image reproduced according to the first embodiment of FIG. 2. A careful examination of FIG. 6 once again reveals a greater fineness of detail compared to the conventional portrait of FIG. 1.

Figure 7:
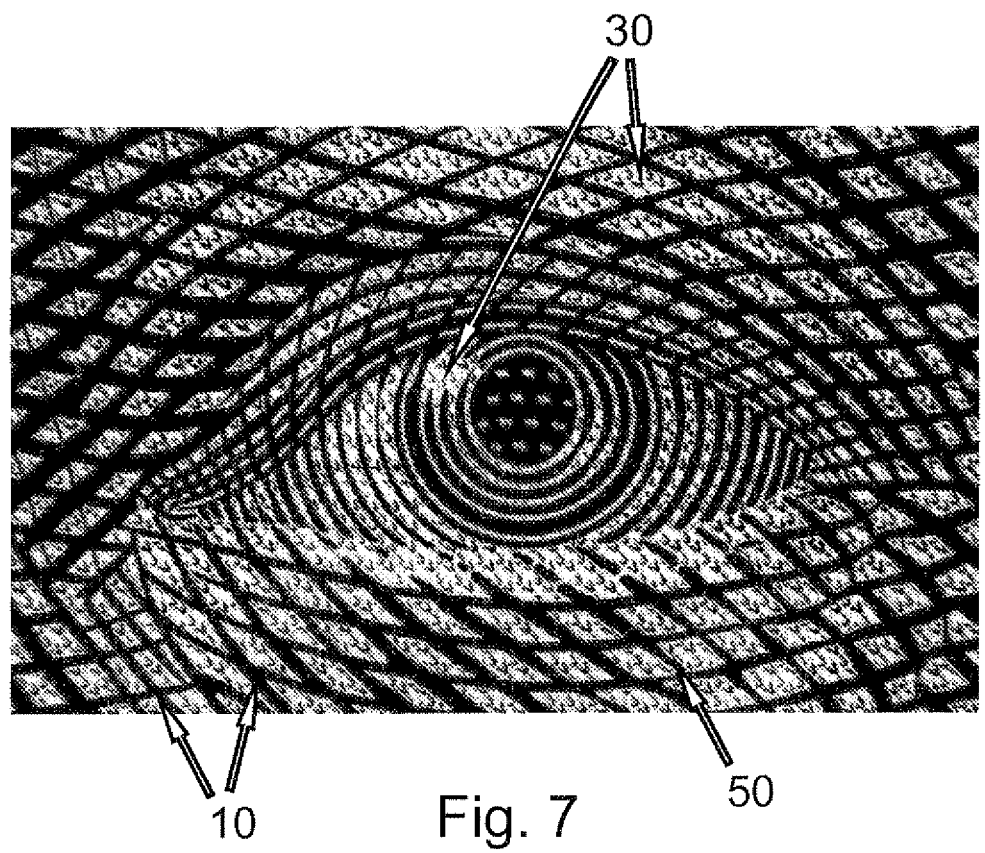
FIG. 7 shows an enlarged view of a first detail of the portrait of FIG. 6, namely the area of the eye on the right part of the portrait.
Figure 8:
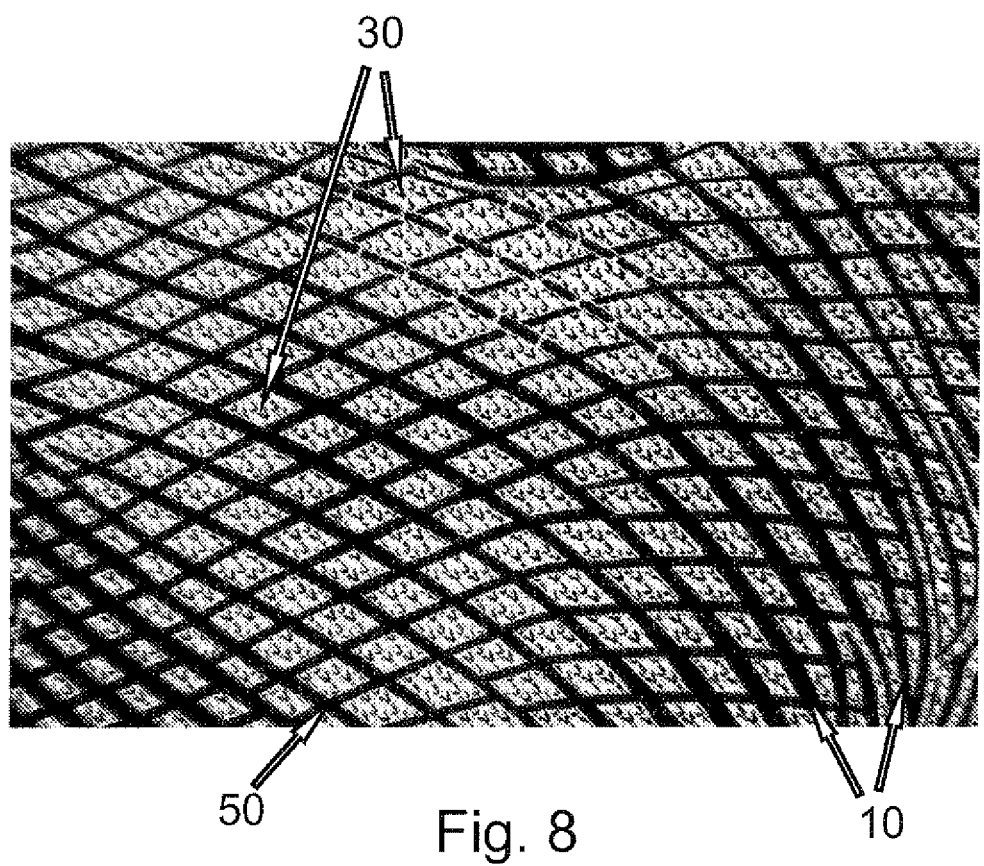
FIG. 8 shows an enlarged view of a second detail of the portrait of FIG. 6, namely an area of the right part of the cheek.
Figure 9:
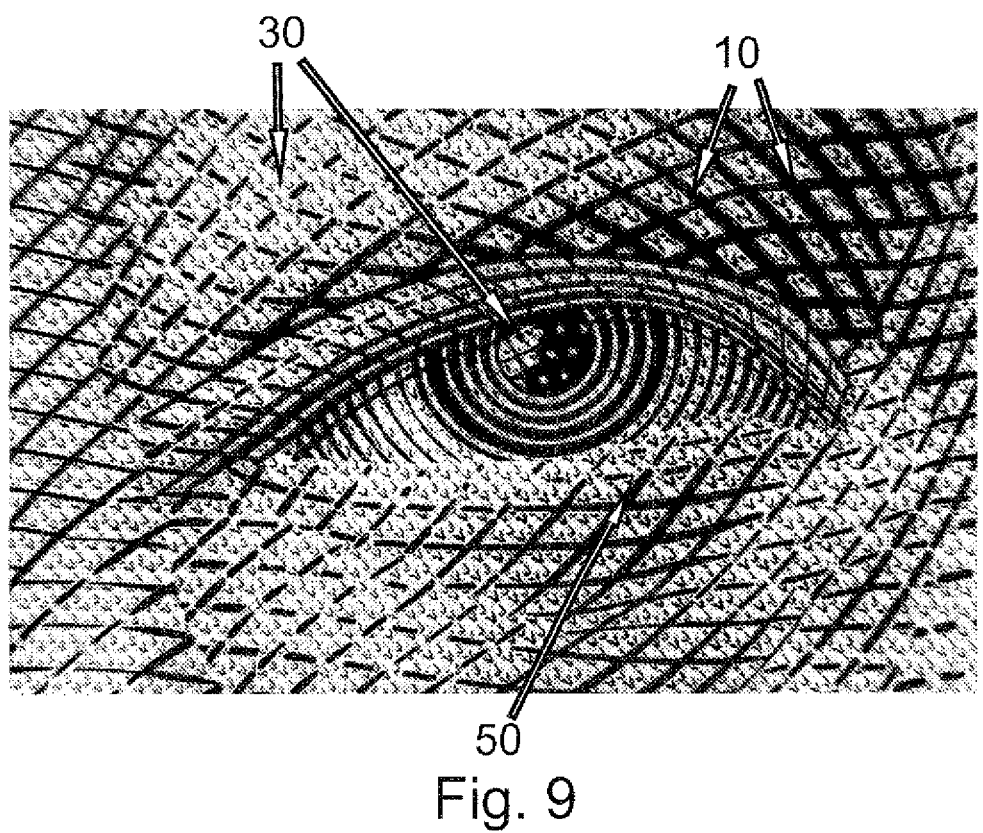
FIG. 9 shows an enlarged view of a third detail of the portrait of FIG. 6, namely the area of the eye on the left part of the portrait.

Unlike the first embodiment, the second embodiment of FIG. 6 incorporates a second set of patterns made up of repetitive microstructures (designated by the numerical reference 30 in FIGS. 7 to 9) reproducing information that can be recognized by an observer. More specifically, as illustrated in the details of FIGS. 7 to 9, said repetitive microstructures are microletters reproducing the information "JV". They could alternatively be numerals or any other pictorial microsymbol (star, more or less complex geometrical shapes, etc.).

Preferably, the microstructures 30 have a line width that does not exceed a few tens of microns. The term "line width" should be understood to mean the width of the drawing of the microstructures, and not the size of the microstructures. In FIGS. 7 to 9, the line width is thus of the order of 10 to 50 microns (depending on the modulation) and the character size of the order of around 100 microns.

According to this second embodiment, the illustrated microstructures 30 should once again be differentiated from the microtexts that can conventionally be incorporated in an intaglio pictorial pattern. According to the state of the art, these microtexts are an integral part of the lines and curves of the main drawing, that is, the microtexts are structured to form a line or a curve (as in the case of the American 100 Dollar bill). However, according to the present invention, the microletters or microsymbols are not as such structured to form lines or curves, but are interposed in the spaces between the lines and the curves of the main drawing. Furthermore, these repetitive microstructures are dimensionally modulated to reproduce the halftones of the image, complementing the halftones reproduced by the lines and curves of the main drawing; The repetitive microstructures according to the invention therefore help in the rendering of the halftones of the image and not only fulfil a function consisting in concealing intelligible information in the drawing.

Preferably, as illustrated in FIGS. 6 to 9, the microstructures 30 are interlaced between the lines and the curves 10 so as to present no contiguous part and leave a small space 50 between the microstructures 30 and the lines and curves 10. This space 50 can be defined with precision to have dimensions of the order of a few microns. Because of its very small dimensions, this space 50 cannot easily, or even not at all, be detected by conventional photographic capture means. Such a spacing could also be provided in the context of the first embodiment described previously.

As in the case already mentioned concerning the first embodiment, it is preferable to dimensionally modulate the repetitive microstructures 30 in such a way that, for a given area of the image, the tone reproduced by the lines and curves 10 is darker than the tone reproduced by the microstructures 30. This once again makes it possible to ensure a predominance of the lines and curves 10 in reproducing the tones and the contrast of the image and better "cast" the microstructures 30 in the whole of the image so as to render the latter less easily detectable by conventional capture means.

In the illustrations of FIGS. 7 to 9, it can be seen that the "interlines" (or "inner dots") present in the conventional representation in the lozenge-shaped spaces between the sets of crossed lines and curves representing the skin (areas A in FIG. 1) have been eliminated in the second embodiment. This advantageously makes it possible to provide more space for the repetitive microstructures so they can be better identified. A variant of the second embodiment incorporating the "inner dots" can, however, be perfectly well envisaged in the context of the present invention.

Concerning the dimensional modulation of the microstructures that make up the second set of patterns, this modulation can be performed according to a screening technique consisting in modulating a regular or irregular screen consisting of said microstructures on the basis of the halftone image to be reproduced, for example a gray-level image of the drawing to be reproduced. The result is an image in which the dot, that is, the microstructures, are dimensionally modulated to reproduce the halftones of the image. Once this modulated screen is generated, it can be interlaced between the lines and curves that make up the first set of patterns forming the greater part of the drawing.

The embodiments according to the invention can advantageously be generated according to the principles set out in International application WO 03/103962 mentioned in the preamble and incorporated herein by reference in its entirety. According to these principles, the patterns (that is, both the lines and curves that make up the first set of patterns and the microstructures that make up the second set of patterns) can be generated in the form of three-dimensional patterns, namely patterns with not only a certain width, but also a certain depth. In the context of the present invention, the expression "dimensional modulation" of the patterns should be understood to mean a modulation in width and/or in depth of said patterns.

Advantageously, according to a variant of the invention, provision can be made for the lines and curves that make up the first set of patterns not to be dimensionally modulated in the same way as the microstructures that make up the second set of patterns. For example, the lines and curves could have a constant depth, whereas the microstructures are modulated in depth, or vice versa. The idea here is to introduce a differentiation between the two sets of patterns in the way in which the patterns of each set are dimensionally modulated.

Along the same lines, it is possible to envisage assigning each pattern a predetermined engraving profile. For example, the lines and curves that make up the first set of patterns could be generated so as to present a substantially trapezoidal engraving profile, with a bottom, whereas the microstructures could be generated so as to present a "V" shaped engraving profile. The idea is once again to introduce an additional differentiation between the two sets of patterns, this time regarding the engraving profile of each set of patterns.

Again by way of advantageous variant, at least two separate repetitive microstructures (such as the "J" and the "V" in the second embodiment) can be dimensionally modulated in different ways, for example one with a constant depth and the other with a variable depth.

Regarding the abovementioned variants, it is also possible to envisage modulating only in depth a portion of the generated patterns, the depth variations of the duly-generated patterns also making it possible to reproduce various halftones.

The transposition into an intaglio printing plate of the patterns generated according to the present invention can be achieved according to the principles set out in International application WO 03/103962. In this context, the transposition can be performed, preferably by laser engraving, either directly into a printing plate or indirectly into a printing plate precursor, this precursor then being used to produce several printing plates by electroplating.

As proposed in International application WO 03/103962, the transposition of the generated patterns will advantageously comprise the generation of a set of three-dimensional digital data made up of pixels, each representative of an individual point to be engraved in the surface of the printing plate or of the printing plate precursor, the engraving as such being carried out pixel by pixel on the basis of this three-dimensional digital data.

This technique is particularly suitable for producing printing plates with the patterns generated according to the invention in as much as this technique is essentially independent of the degree of complexity of the drawing to be engraved. The interlacing of a myriad of microstructures between the lines and curves that make up the first set of patterns will therefore present no problem from the point of view of the engraving of said microstructures. However, the replication of such a myriad of microstructures manually or vectorially by conventional engraving means will be too tedious and complex to be able to be reasonably envisioned by a counterfeiter.

It should be understood that the present application also encompasses any plate (notably, any printing plate or any printing plate precursor according to the description in the application WO 03/103962) engraved so as to present engraved patterns reflecting the patterns generated according to the present invention.

The present application also encompasses a value document, advantageously a banknote, like the one illustrated in FIG. 2 (or any other security document, such as a passport, an identity card, a check, etc.), comprising a printed pattern reflecting the patterns generated according to the present invention. This printed pattern is advantageously printed according to an intaglio printing method by means of the abovementioned engraved plate. The printed pattern could, however, be printed according to any other appropriate printing method, for example an offset printing method. In the latter case, however, the dimensional modulation of the patterns can apply only to a two-dimensional modulation of the patterns. Intaglio printing offers the advantage that three-dimensional patterns can be created on the value document, the dimensional modulation of the patterns thus possibly involving playing with the depth or the height of the patterns as discussed above.

It will be understood, generally, that various modifications and/or enhancements that are obvious to those skilled in the art can be made to the embodiments described in the present description without departing from the scope of the invention defined by the appended claims.

In particular, although the appended drawings show only a portrait, the invention applies similarly to the reproduction of any other pictorial pattern according to an intaglio rendering technique.

Furthermore, although FIGS. 5 to 8 show repetitive microstructures made up of microletters, it is obvious that any other microstructure reproducing information that can be recognized by an observer can be used, for example numerals and/or determined geometrical symbols.

In the context of the present invention, the expression "microletter" encompasses any alphanumeric symbol, Moreover, it can perfectly well be considered, in the context of the present invention, that the microstructures of the second set include both stochastic microstructures and repetitive microstructures (for example, microletters, numerals and/or geometrical symbols).

The invention claimed is:

1. A method of generating patterns representing a halftone image, said method comprising the generation of a first set of patterns consisting of lines and curves dimensionally modulated to produce variations in tones reproducing the halftones of the image using an intaglio rendering technique, which lines and curves define a plurality of spaces between the lines and curves, the generation of a second set of patterns consisting of microstructures that are distinct from the lines and curves of the first set of patterns, said microstructures being dimensionally modulated to produce variations in tones reproducing the halftones of the image, said microstructures consisting of stochastic microstructures forming a grain, said second set of patterns being interlaced with said first set of patterns such that said microstructures of the second set of patterns occupy the plurality of spaces between the lines and curves of the first set of patterns and so that the halftones reproduced by the second set of patterns complement the halftones reproduced by the first set of patterns, the first and second set of patterns forming two complementary sets of patterns reproducing the halftones of the image.

2. The method as claimed in claim 1, wherein said stochastic microstructures have dimensions of less than 10 microns.

3. The method as claimed in claim 1, wherein said microstructures are dimensionally modulated according to a screening technique consisting in modulating a regular or irregular screen consisting of said microstructures on the basis of said halftone image.

4. The method as claimed in claim 1, wherein, for a given area of the image, the tone reproduced by the lines and curves of said first set of patterns is darker than the tone reproduced by the microstructures of said second set of patterns.

5. The method as claimed in claim 1, wherein said first and second sets of patterns are interlaced in such a way that the two sets do not present any contiguous part and are spaced apart from each other.

6. The method as claimed in claim 1, wherein said generated patterns are three-dimensional patterns and wherein the dimensional modulation of said patterns comprises the width and/or depth modulation of said patterns.

7. The method as claimed in claim 6, wherein the lines and curves of the first set of patterns are not dimensionally modulated in the same way as the microstructures of the second set of patterns.

8. The method as claimed in claim 6, wherein the generation of said patterns includes the assignment to each pattern of a determined engraving profile.

9. The method as claimed in claim 8, wherein the engraving profile of the lines and curves of the first set of patterns can be differentiated from the engraving profile of the microstructures of the second set of patterns.

10. The method as claimed in claim 1, wherein said halftone image is a portrait.

11. A method of producing an intaglio printing plate, wherein it comprises the transposition by direct engraving into a printing plate or by indirect engraving into a printing plate precursor of the patterns generated according to the method of claim 1.

12. The method as claimed in claim 11, wherein the transposition of said patterns by direct or indirect engraving comprises the generation of a set of three-dimensional digital data consisting of pixels each representative of an individual point to be engraved in the surface of said printing plate or of said printing plate precursor and wherein the engraving is done pixel by pixel on the basis of said three-dimensional digital data.

13. The method as claimed in claim 11, wherein the engraving is done by laser.

14. An engraved plate comprising engraved patterns representing a halftone image, wherein said engraved patterns are the patterns generated according to the method of claim 1.

15. A value document comprising printed patterns representing a halftone image, wherein said printed patterns are the patterns generated according to the method of claim 1.

16. A value document according to claim 15, wherein the value document is a banknote.

17. A value document produced from an engraved plate comprising engraved patterns representing a halftone image, wherein said engraved patterns are the patterns generated according to the method of claim 1.

18. A value document according to claim 17, wherein the value document is a banknote.

19. A method of generating patterns representing a halftone image, said method comprising the generation of a first set of patterns consisting of lines and curves dimensionally modulated to produce variations in tones reproducing the halftones of the image using an intaglio rendering technique, which lines and curves define a plurality of spaces between the lines and curves, the generation of a second set of patterns consisting of microstructures that are distinct from the lines and curves of the first set of patterns, said microstructures being dimensionally modulated to produce variations in tones reproducing the halftones of the image, said microstructures consisting of repetitive microstructures comprising microletters and/or microsymbols reproducing recognizable information, said second set of patterns being interlaced with said first set of patterns such that said microstructures of the second set of patterns occupy the plurality of spaces between the lines and curves of the first set of patterns and so that the halftones reproduced by the second set of patterns complement the halftones reproduced by the first set of patterns, the first and second set of patterns forming two complementary sets of patterns reproducing the halftones of the image.

20. The method as claimed in claim 19, wherein said repetitive microstructures comprise at least first and second distinct repetitive microstructures, and wherein at least the first repetitive microstructure is not dimensionally modulated in the same way as the second repetitive microstructure.

21. The method as claimed in claim 19, wherein the line width of said repetitive microstructures does not exceed a few tens of microns.

22. The method as claimed in claim 19, wherein said microstructures are dimensionally modulated according to a screening technique consisting in modulating a regular or irregular screen consisting of said microstructures on the basis of said halftone image.

23. The method as claimed in claim 19, wherein, for a given area of the image, the tone reproduced by the lines and curves of said first set of patterns is darker than the tone reproduced by the microstructures of said second set of patterns.

24. The method as claimed in claim 19, wherein said first and second sets of patterns are interlaced in such a way that the two sets do not present any contiguous part and are spaced apart from each other.

25. The method as claimed in claim 19, wherein said generated patterns are three-dimensional patterns and wherein the dimensional modulation of said patterns comprises the width and/or depth modulation of said patterns.

26. The method as claimed in claim 25, wherein the lines and curves of the first set of patterns are not dimensionally modulated in the same way as the microstructures of the second set of patterns.

27. The method as claimed in claim 25, wherein the generation of said patterns includes the assignment to each pattern of a determined engraving profile.

28. The method as claimed in claim 27, wherein the engraving profile of the lines and curves of the first set of patterns can be differentiated from the engraving profile of the microstructures of the second set of patterns.

29. The method as claimed in claim 19, wherein said halftone image is a portrait.

30. A method of producing an intaglio printing plate, wherein it comprises the transposition by direct engraving into a printing plate or by indirect engraving into a printing plate precursor of the patterns generated according to the method of claim 19.

31. The method as claimed in claim 30, wherein the transposition of said patterns by direct or indirect engraving comprises the generation of a set of three-dimensional digital data consisting of pixels each representative of an individual point to be engraved in the surface of said printing plate or of said printing plate precursor and wherein the engraving is done pixel by pixel on the basis of said three-dimensional digital data.

32. The method as claimed in claim 30, wherein the engraving is done by laser.

33. An engraved plate comprising engraved patterns representing a halftone image, wherein said engraved patterns are the patterns generated according to the method of claim 19.

34. A value document comprising printed patterns representing a halftone image, wherein said printed patterns are the patterns generated according to the method of claim 19.

35. A value document according to claim 34, wherein the value document is a banknote.

36. A value document produced from an engraved plate comprising engraved patterns representing a halftone image, wherein said engraved patterns are the patterns generated according to the method of claim 19.

37. A value document according to claim 36, wherein the value document is a banknote.

* * * * *